US009729746B1

(12) United States Patent
Hong

(10) Patent No.: US 9,729,746 B1
(45) Date of Patent: Aug. 8, 2017

(54) APPROACH FOR REGISTERING PRINTING DEVICES WITH A CLOUD PRINT SERVICE

(71) Applicant: Jiang Hong, San Jose, CA (US)

(72) Inventor: Jiang Hong, San Jose, CA (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/181,635

(22) Filed: Jun. 14, 2016

(51) Int. Cl.
*G06F 15/00* (2006.01)
*G06F 3/12* (2006.01)
*G06K 1/00* (2006.01)
*H04N 1/00* (2006.01)
*H04N 1/44* (2006.01)

(52) U.S. Cl.
CPC ..... *H04N 1/00938* (2013.01); *H04N 1/00347* (2013.01); *H04N 1/4413* (2013.01); *H04N 2201/0094* (2013.01)

(58) Field of Classification Search
CPC .......... H04N 1/00938; H04N 1/00347; H04N 1/4413; H04N 2201/0094
USPC ............................. 358/1.15, 1.14, 1.13, 1.1
See application file for complete search history.

(56) References Cited

U.S. PATENT DOCUMENTS

| 2011/0299111 | A1* | 12/2011 | Hasegawa | G06K 15/007 358/1.15 |
| 2015/0124288 | A1* | 5/2015 | Tajima | G06F 3/1203 358/1.15 |
| 2015/0153981 | A1* | 6/2015 | Iwasaki | G06F 3/1238 358/1.14 |

* cited by examiner

Primary Examiner — Douglas Tran
(74) Attorney, Agent, or Firm — Hickman Palermo Becker Bingham LLP; Edward A. Becker

(57) ABSTRACT

A printing device configuration application, referred to herein as a "mass deployment tool," provides the capability to configure a large number of printing devices for cloud printing, in accordance with specific requirements of a cloud print service. The mass deployment tool deploys and installs a cloud print configuration application to a plurality of printing devices. The mass deployment tool transmits registration settings data to the cloud print configuration applications and causes the cloud print configuration applications to register their corresponding printing device with the cloud print service. The mass deployment tool receives and stores identification data that specifies a unique identification issued by the cloud print service for each of the printing devices. The mass deployment tool may be configured to provide a graphical user interface that allows a user to specify and manage the registration settings, general settings used to install the cloud print configuration applications, and sharing settings.

20 Claims, 14 Drawing Sheets

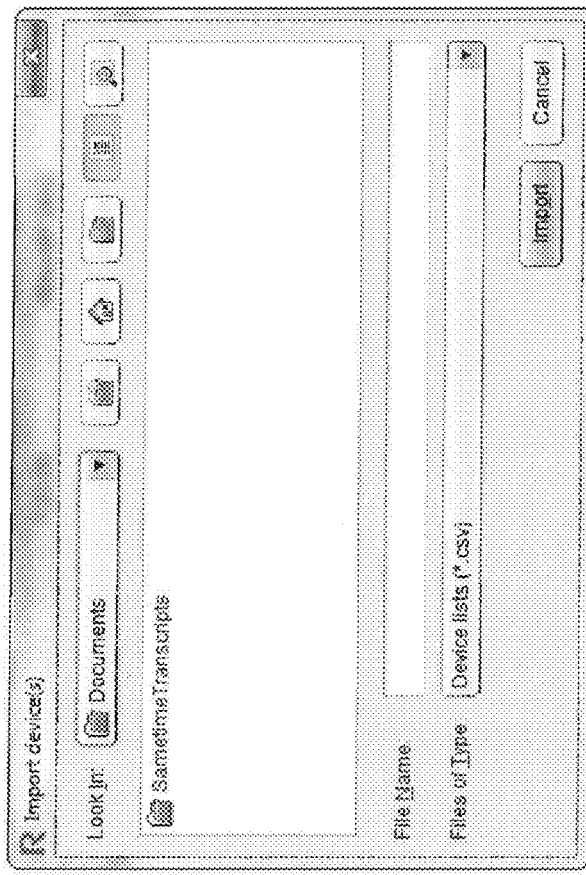

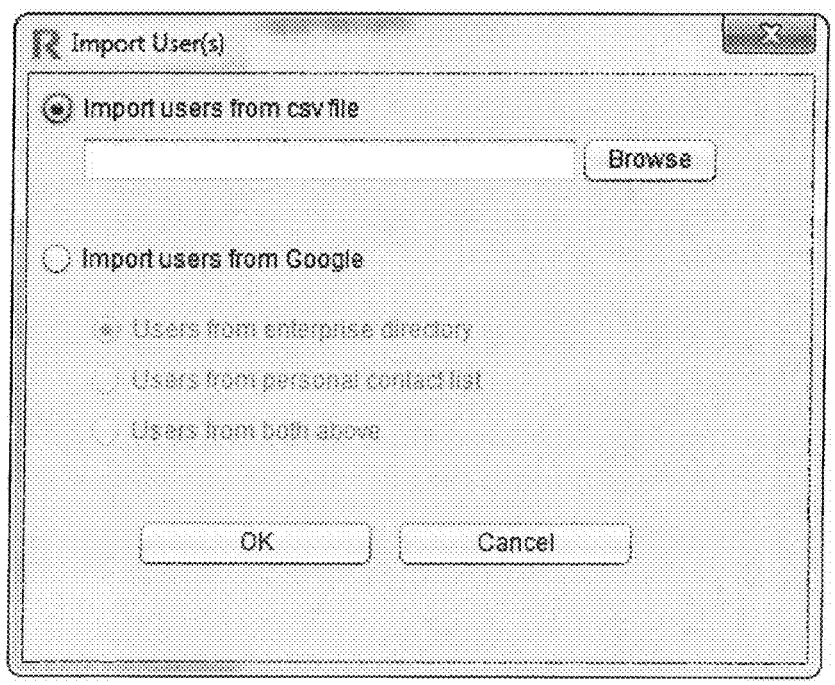

APPROACH FOR REGISTERING PRINTING DEVICES WITH A CLOUD PRINT SERVICE

FIELD

Embodiments relate generally to configuring printing devices for cloud printing.
SUGGESTED GROUP ART UNIT: 2625; SUGGESTED CLASSIFICATION: 358.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

Cloud printing has gained in popularity with the proliferation of handheld mobile client devices, such as smartphones, and increased access to network connectivity. The term "cloud printing" refers generally to the approach for printing via a network instead of directly to a printing device, where the print job is rendered by a network service instead of a client device. Cloud printing provides some significant benefits over conventional printing approaches, including the ability to print a wide variety of content from many different types of client devices without the need for a print driver on the client devices, and the ability to print to a printing device that is not in the same local network as the client device. Most cloud printing solutions require, however, that printing devices be configured with specialized software to interact with a cloud print server and also registered with the cloud print server to be available for cloud printing. Configuring printing devices with specialized software and registering the printing devices with a cloud print server conventionally needs to be performed manually, for example, by a network administrator, which can be very labor intensive, particularly for large deployments.

SUMMARY

An apparatus for registering printing devices with a cloud print service for cloud printing comprises one or more processors, and one or more memories storing instructions which, when processed by the one or more processors, cause a cloud print configuration application to be transmitted to and installed on a plurality of printing devices via one or more networks, wherein the plurality of printing devices are external to the apparatus. The processing of the instructions by the one or more processors also causes registration settings data to be transmitted to the plurality of printing devices via the one or more networks, the cloud print configuration application on the plurality of printing devices to register the plurality of printing devices with a cloud print service that is external to both the apparatus and the plurality of printing devices. Identification data is received, from the cloud print configuration application installed on each printing device from the plurality of printing devices, where the identification data specifies a unique identification issued by the cloud print service for the printing device. The identification data received from the cloud print configuration application installed on each printing device from the plurality of printing devices is then stored. The approach may also be implemented by one or more computer-implemented methods and one or more computer-readable media storing instructions.

BRIEF DESCRIPTION OF THE DRAWINGS

In the figures of the accompanying drawings like reference numerals refer to similar elements.

FIG. 4D depicts an example import printing device screen generated by an MDT in response to a user selecting an "Import" control to import one or more new printing devices.

FIG. 4E depicts example information included for each new printing device.

FIG. 6E is an import users screen generated by an MDT in response to a user selecting an "Import" control from a sharing settings screen.

FIG. 6F depicts an example format of a .CSV file that contains user names, email addresses and/or group names, where the first line of the file includes a title "Invited Users."

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:

I. Overview
II. Architecture
III. Configuring Printing Devices
IV. Printing Device Management
  A. Managing Printing Devices
  B. Registering Printing Devices
  C. Sharing Registered Printing Devices
  D. Updating and Unregistering Registered Printing Devices
V. Settings Management
VI. License Management
VII. Implementation Examples I. Overview A printing device configuration application, referred to herein as a "mass deployment tool," provides the capability to configure a large number of printing devices for cloud printing, in accordance with specific requirements of a cloud print service. The mass deployment tool deploys and installs a cloud print configuration application to a plurality of printing devices. The mass deployment tool transmits registration settings data to the cloud print configuration applications and causes the cloud print configuration applications to register their corresponding printing device with the cloud print service. The mass deployment tool receives and stores identification data that specifies a unique identification issued by the cloud print service for each of the printing devices. The mass deployment tool may be configured to provide a graphical user interface that allows a user to specify and manage the registration settings, general settings used to install the cloud print configuration applications, and sharing settings. Embodiments also include the capability for the mass deployment tool to discover and obtain the current status of the printing devices, provide printing device management via license keys, and provide sharing of registered printing devices. The mass deployment tool allows a user to quickly and easily configure a large number of printing devices for cloud printing with a cloud print service.

II. Architecture

Figure 1:
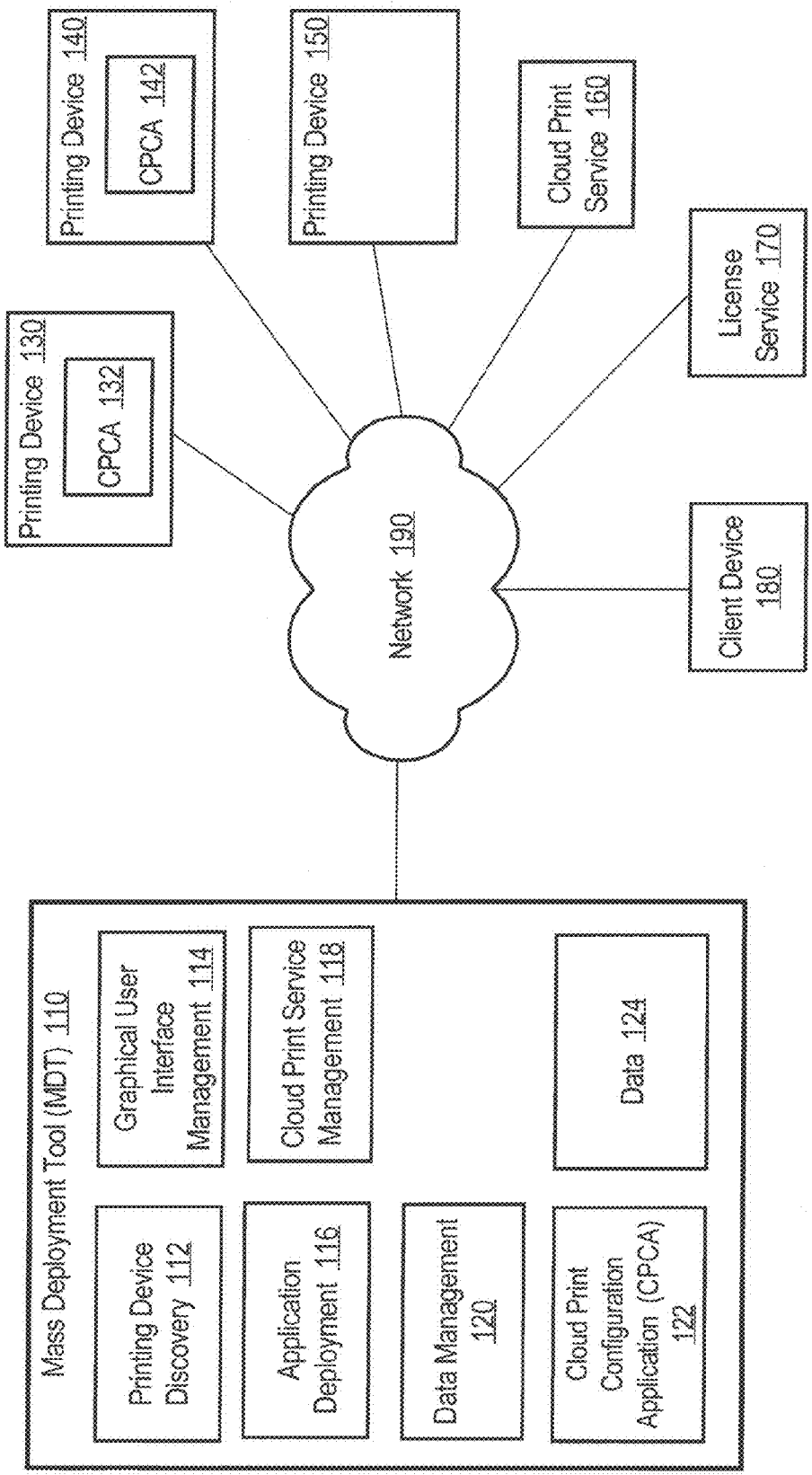
FIG. 1 is a block diagram that depicts an example arrangement for configuring printing devices for cloud printing.

FIG. 1 is a block diagram that depicts an example arrangement 100 for configuring printing devices for cloud printing. In the example depicted in FIG. 1, arrangement 100 includes a mass deployment tool (MDT) 110, printing devices 130, 140, 150, a cloud print service 160, a license service 170, and a client device 180, which are communicatively coupled via a network 190. Network 108 may include any number of network connections, for example, one or more Local Area Networks (LANs), Wide Area Networks (WANs), Ethernet networks or the Internet, and/or one or more terrestrial, satellite or wireless links. The elements depicted in arrangement 100 may also have direct communications links, the types and configurations of which may vary depending upon a particular implementation. Embodiments are not limited to arrangement 100 having the particular elements depicted in FIG. 1 and arrangement 100 may have fewer elements or additional elements, depending upon a particular implementation. In addition, although some embodiments may be described herein in the context of Google Cloud Print, by Google, Inc., this is done for purposes of explanation only and embodiments are not limited to the Google Cloud Print context.

MDT 110 provides the capability to configure a large number of printing devices for cloud printing, in accordance with specific requirements of a cloud print service. As depicted in FIG. 1, MDT 110 includes various types of functionality including printing device discovery 112, graphical user interface management 114, application deployment 116, cloud print service management 118 and data management 120. This functionality is depicted in FIG. 1 and described herein as being separate for purposes of explanation only, and this functionality may be combined or separated in any manner that may vary depending upon a particular implementation. Each of these functionalities is described in more detail hereinafter.

MDT 110 includes a cloud print configuration application (CPCA) 122 that is deployed to printing devices 130, 140, 150 to allow printing devices 130, 140, 150 to be automatically registered with cloud print service 160 for cloud printing, as described in more detail hereinafter. According to one embodiment, CPCA 122 implements at least a portion of an application program interface (API) of cloud print service 160 to allow access to registration functionality provided by cloud print service 160. Embodiments are described herein in the context of printing devices needing to be registered with cloud print service 160 to be allowed to be used via cloud print service 160. CPCA 122 may be implemented in a wide variety of structures and formats that may vary depending upon a particular implementation. For example, CPCA 122 may be an executable program, such as a Java application. CPCA 122 may be a "package" that includes an executable program and data used by the executable program. Although CPCA 122 is depicted in FIG. 1 as a single entity, MDT 110 may manage multiple versions of CPCA 122 that are appropriate for different Java environments on printing devices, as described in more detail hereinafter.

Figure 2:
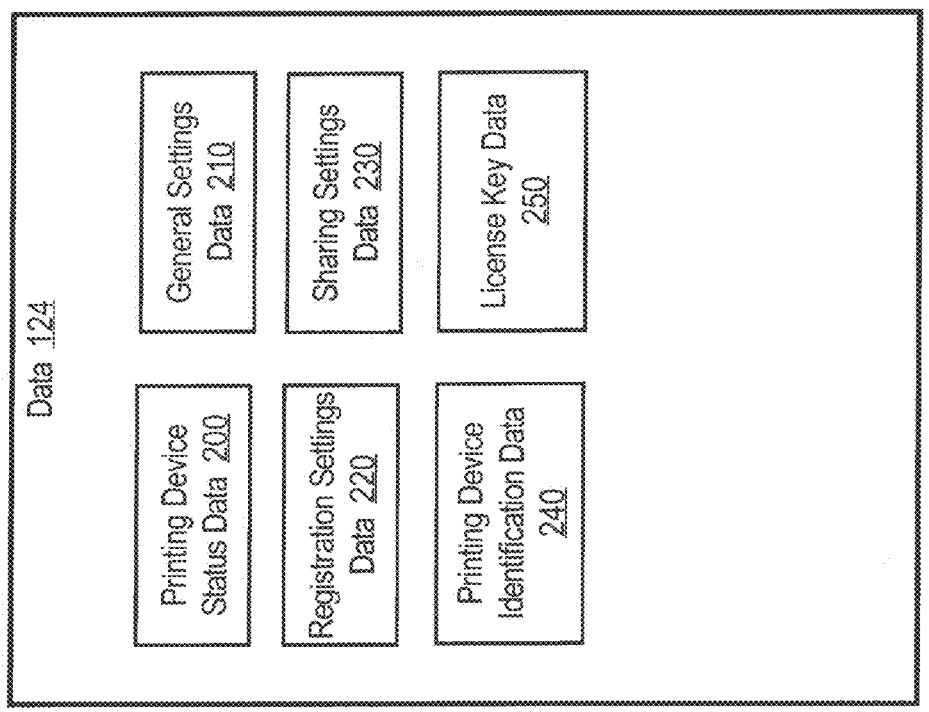
FIG. 2 depicts printing device status data, general settings data, registration settings data, sharing settings data, printing device identification data and license key data.

MDT 110 manages data 124 that may include a wide variety of data that may vary depending upon a particular implementation. Data 124 may be stored in any format and may be unstructured or structured. For example, data 124 may be stored in a flat file, or stored in a database. FIG. 2 depicts that data 124 may include printing device status data 200, general settings data 210, registration settings data 220, sharing settings data 230, printing device identification data 240 and license key data 250. Printing device status data 200 includes data that specifies the current status of printing devices. General settings data 210 includes user credentials required to install CPCA 122 onto printing devices. Registration settings data 220 includes data that is used by the CPCA 122 installed on printing devices to register the printing devices with cloud print service 160. Sharing settings data 230 includes data that is used to share registered printing devices with other users, including email addresses of other users. Printing device identification data 240 includes printing device identification data issued by cloud print service 160 for printing devices after registration. This may include, for example, an identifier for each registered printing device that uniquely identifies the registered printing device. License key data 250 includes license keys selected for registered printing devices to be used to manage and track access to registered printing devices.

MDT 110 may be implemented by computer hardware, computer software, or any combination of computer hardware and computer software. MDT 110 may be implemented as a stand-alone application/service, or integrated into other services. In addition, MDT 110 may be implemented in different locations that may vary depending upon a particular implementation. For example, MDT 110 may be implemented on a client device, on a printing device, or on a network element, such as a server. MDT 110 may be configured to generate and provide a graphical user interface that supports the various functionality described herein. The graphical user interface may be comprised of a plurality of graphical user interface objects that display information to a user and provide controls for the user to select functions and enter data. The graphical user interface may be an integrated graphical user interface, or may be provided to client devices, e.g., via one or more Web pages.

Printing devices 130, 140, 150 may be implemented by any type of device that includes printing functionality. Examples of printing devices 130, 140, 150 include, without limitation, printers, image forming devices, facsimile devices, multi-function peripherals (MFPs), etc. In FIG. 1, printing devices 130, 140, each include a CPCA 132, 142, respectively, that allows printing device 130, 140 to be automatically registered by MDT 110 for cloud printing with cloud print service 160. Printing devices 130, 140 include any capabilities required to support the execution of CPCA 132, 142, respectively. For example, in the context of CPCA 132, 142 implemented as a Java application, printing devices 130, 140 each run a Java virtual machine. Printing device 150 does not yet have a CPCA and must be manually registered with cloud print service 160 to be allowed to use the cloud printing services provided by cloud print service 160.

Cloud print service 160 is a cloud-based print service that allows users to print content from a wide variety of client devices to many different printing devices via one or more networks. Cloud print service 160 handles the rendering of print data into formats required by printing devices so that client devices to not need to have a print driver installed for a printing device that a user wishes to print to. Instead, content is provided to, and optionally stored by, cloud print service 160. The content is rendered to create a print job that is capable of being processed by a particular target printing device and the print job is provided to the particular target printing device for printing. Content may be immediately processed for printing by cloud print service 160 or alternatively, content may be stored by cloud print service 160 for printing at a later time. Cloud print service 160 may support a "pull" model, a "push" model, or both a "pull" and "push" model for making print data available to printing devices. The "pull" model refers to an approach where rendered print data is stored by cloud print service 160 until requested by a printing device. The "push" model refers to an approach where rendered print data is transmitted by cloud print service 160 to printing devices without being requested to do so by a printing device.

According to one embodiment, printing devices must be registered with cloud print service 160 to be available for printing content via cloud print service 160. Registration may include a wide variety and number of steps that may vary depending upon a particular implementation. According to one embodiment, cloud print service 160 includes an API that provides access to the registration functionality supported by cloud print service 160. Printing devices may themselves implement the API of cloud print service 160 to enable registration with cloud print service 160. Alternatively, a computing device attached to a printing device may implement the API of cloud print service 160 to enable registration of the printing device with cloud print service 160. Registered printing devices are made available to a user for printing via cloud print service 160. According to one embodiment, cloud print service 160 issues and manages identification data that uniquely identifies a registered printing device and is used to provide controlled access to the registered printing device. One example embodiment of cloud print service 160 is Google Cloud Print by Google, Inc. According to one embodiment, cloud print service 160 is configured to allow users to share printing devices so that a printing device registered with cloud print service 160 by a particular user may also be used by another user.

License service 170 is a service that manages license keys received from printing devices that include the CPCA, such as printing devices 130, 140. The license keys may be used by a process, such as a billing or other financial application, to track usage of printing devices 130, 140. Client device 180 may be implemented by any type of client device for using cloud print service 160 to print content to printing devices 130, 140. Examples of client devices include, without limitation, a telephony device such as a smartphone, a laptop or portable computing device, a tablet computing device, a desktop computing device, a workstation, a personal digital assistant (PDA), etc.

III. Configuring Printing Devices

Figure 3:
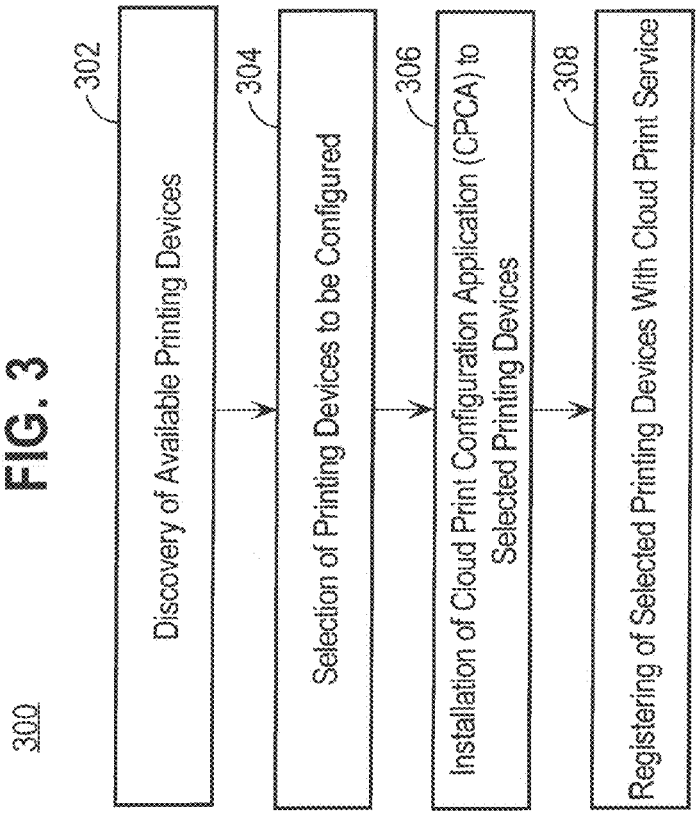
FIG. 3 is a flow diagram that depicts an approach for configuring printing devices for cloud printing, according to an embodiment.

FIG. 3 is a flow diagram 300 that depicts an approach for configuring printing devices for cloud printing, according to an embodiment. In step 302, available printing devices are discovered. For example, MDT 110 may discover that printing devices 130, 140, 150 are available. Discovery may be implemented, for example, in response to a user selection of a control on the graphical user interface provided by MDT 110.

For purposes of explanation, it is presumed that printing devices 130, 140, 150 are not previously known to MDT 110 and do not have CPCA 132, 142 installed. MDT 110 may implement any type of discovery mechanism to discover printing devices. For example, MDT 110 may be configured to transmit multicast messages over network 112 to discover printing devices 130, 140, 150. As another example, MDT 110 may implement a Web Services discovery mechanism to discover printing devices 130, 140, 150. MDT 110 may be configured to perform discovery at specified times, for example on a periodic basis, or in response to a user request. In addition, MDT 110 may be configured to discover all available printing devices on a network, or a subset of the available printing devices on the network. MDT 110 may be configured to perform different types of discovery. According to one embodiment of the invention, MDT 110 is configured to discover enough information about printing devices to know whether the printing devices are capable of executing CPCA 122. For example, in the context of CPCA 122 being implemented as a Java application, MDT 110 is configured to determine whether a target printing device has a Java environment that will support the execution of the Java application. According to one embodiment, only printing devices that are capable of executing CPCA 122 are made available to be configured using the approaches described herein.

In step 304, a selection of printing devices to be configured is made. For example, the graphical user interface of MDT 110 may allow a user to view the available printing devices discovered by MDT 110 and select particular printing devices to be configured. This may include a large number of discovered printing devices, e.g., hundreds or even thousands, to allow a user to configure a large number of printing devices as a batch.

In step 306, the CPCA 122 is installed on the printing devices selected by the user. For example, suppose that MDT 110 discovered printing devices 130, 140, 150 and identified these printing devices in a list with graphical user interface controls that allow a user to select particular printing devices that CPCA 122 to be configured. Suppose further that the user selected printing devices 130, 140 to be configured. In response to this selection, MDT 110 causes CPCA 122 to be transmitted to and installed on printing devices 130, 140. In some situations, installing software on printing devices requires providing access credentials for security purposes. Therefore, according to one embodiment, MDT 110 is configured to retrieve access credential data, such as a user name and password, from general settings data 210, and provide the access credential data to a target printing device when installing CPCA 122 on the target printing device. MDT 110 is also configured to invoke any functionality necessary to install CPCA 122 on the target printing device. This may include, for example, making calls to an API provided by a target printing device to invoke installer functionality to install CPCA 122. MDT 110 may also cause CPCAs 132, 142 to be started on printing devices 130, 140 after installation.

According to one embodiment, a license key is provided to each printing device with CPCA 122, and after CPCAs 132, 142 have been started on printing devices 130, 140, CPCAs 132, 142 determine whether the license key is a valid, usable license key, before allowing their corresponding printing device to be registered with cloud print service 160, when requested. The license key provided to each printing device may be manually specified or selected by a user of MDT 110, or automatically selected by MDT 110. CPCAs 132, 142 consult license service 170 to determine the status of their license key. Upon verifying that their license key has a status of "Activated," then CPCAs 132, 142 will allow registration of their respective printing device when requested to do so. CPCAs 132, 142 will not allow registration of their respective printing devices if their respective license key has a status of "Invalid," "Not Usable," or "Usable."

In step 308, the selected printing devices are registered with the cloud print service. In the present example, printing devices 130, 140 are registered with cloud print service 160. According to one embodiment, this is performed automatically by CPCA 132, 142 installed on printing devices 130, 140 using registration settings specified by registration settings data 220. Registrations settings data 220 may be transmitted to printing device 130, 140 with CPCA 122 when CPCA 122 is transmitted to printing devices 130, 140. Alternatively, registration settings data 220 may be transmitted separately to printing devices 130, 140. As described in more detail hereinafter, MDT 110 provides a graphical user interface that allows a user to specify registration settings that are used to register selected printing devices with cloud print service 160. According to one embodiment, CPCA 132, 142 invoke registration functionality provided via an API of cloud print service 160 to register printing devices 130, 140, respectively, with cloud print service 160. This may include CPCA 132, 142 performing any "handshaking" required by cloud print service 160.

According to one embodiment, CPCA 132, 142 provide user credentials and a printing device name to cloud print service 160 as part of the registration process. The user credentials may be the user credentials for an administrative user of MDT 110 and may be provided by MDT 110 to CPCA 132, 142 when MDT 110 requests that CPCA 132, 142 register printing devices 130, 140, respectively, with cloud print service 160. Upon completion of the registration process, printing devices 130, 140 are registered with cloud print service 160 under the user credential for the administrative user of MDT 110. Cloud print service 160 issues a unique identification and OAuth token for each printing device and provides these to CPCAs 132, 142 on printing devices 130, 140. CPCAs 132, 142 use the unique identification and OAuth token to make subsequent calls to cloud print service 160 on behalf of printing devices 130, 140. CPCAs 132, 142 also provide the unique identifications and OAuth tokens to MDT 110 to allow MDT 110 to share registered print devices 130, 140 with other users as described in more detail hereinafter.

According to one embodiment, CPCA 132, 142 are configured to report results of registering printing devices 130, 140 with cloud print service 160 back to MDT 110. This may include any information issued by cloud print service 160 for registered printing devices 130, 140. Thus, with the aforementioned approach, MDT 110 provides for the automatic registration of any number of printing devices for cloud printing with cloud print service 160. This may improve the performance of computing devices in arrangement 100 by reducing the amount of computation resources and network traffic required to register printing devices with cloud print service 160.

IV. Printing Device Management

According to one embodiment, MDT 110 provides a wide variety of printing device management functionality, as described in more detail hereinafter.

A. Managing Printing Devices

Figure 4A:
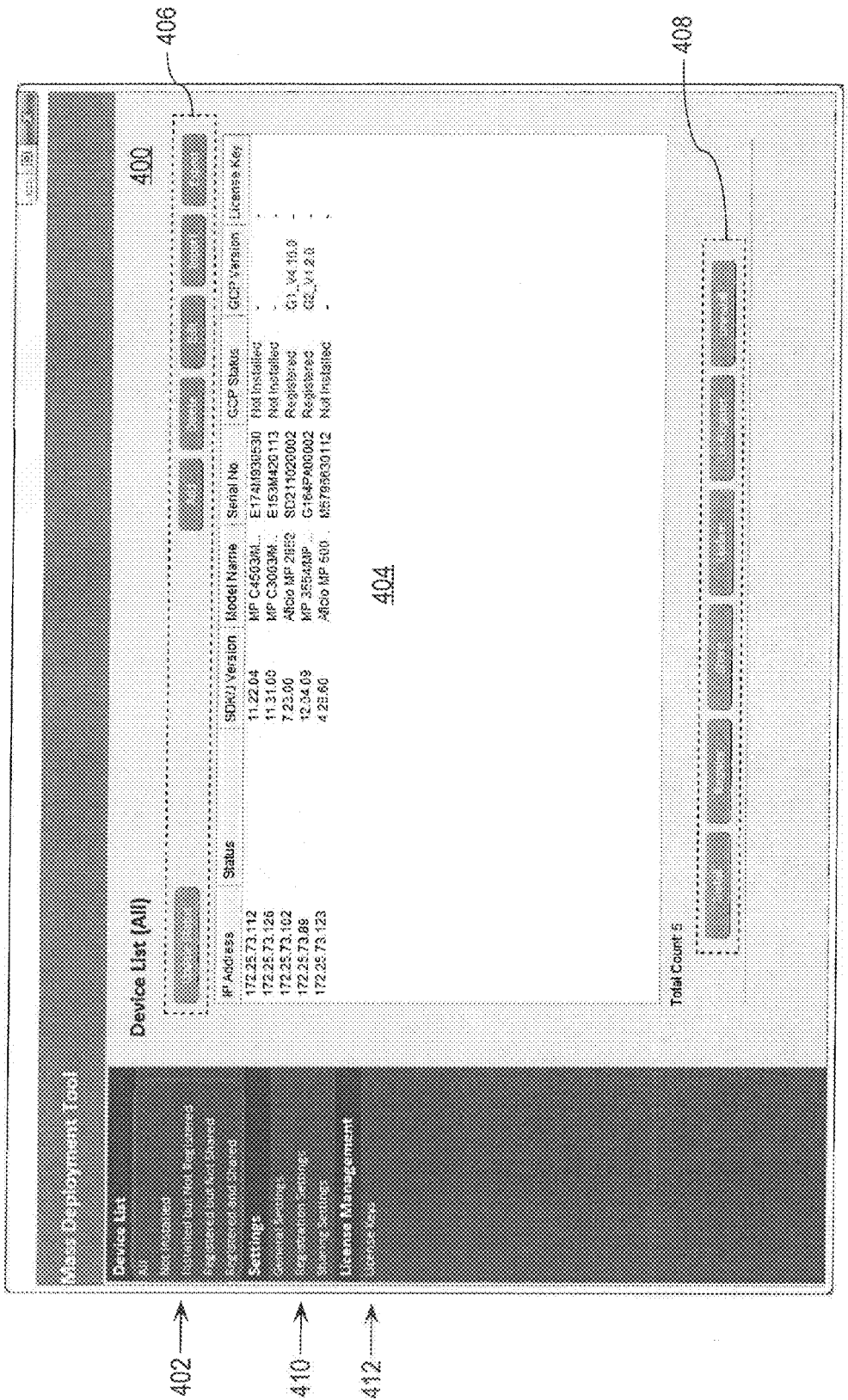
FIG. 4A depicts an example printing device management screen generated by a Mass Deployment Tool (MDT) for managing and registering printing devices with a cloud print service.

According to one embodiment, MDT 110 provides functionality that allows users to add, edit, or delete printing devices, as well as import and export information for printing devices. FIG. 4A depicts an example printing device management screen 400 generated by MDT 110 for managing and registering printing devices with a cloud print service. Printing device management screen 400 includes a set of device list controls 402 that allow a user to select by category, the printing devices to be included in the printing device details area 404. In the example depicted in FIG. 4A, five categories of printing devices are used, including "All," "Not Installed," "Installed but Not Registered," "Registered but Not Shared," and "Registered and Shared." "Installed" refers to whether CPCA 122 has been installed on a printing device, "Registered" refers to whether a printing device, for which CPCA 122 has been installed, has been registered with cloud print service 160, and "Shared" refers to whether access to a registered printing device has been shared with other users. When the status of a printing device changes, the category assigned to the printing device is automatically changed. The category assigned to a printing device may be stored in printing device status data 200.

In the example depicted in FIG. 4A, the "All" control from device list controls 402 has been selected. According to one embodiment, selecting the "All" control from device list controls 402 causes MDT 110 to display information for all known printing devices. As previously described herein, this may include only those printing devices that are capable of executing CPCA 122. The information for the known printing devices may be retrieved from printing device status data 200. Alternatively, MDT 110 may perform discovery to discover all available printing devices and information about those printing devices. Furthermore, MDT 110 may be configured to periodically perform discovery and obtain current status and capability information from discovered printing devices. MDT 110 may store the discovered information in printing device status data 200. The printing device details area 404 lists details for each of the printing devices, including an IP address, a status of the printing device, a Java virtual machine version (SDK/J Version), a model name, a serial number, a cloud print (GCP) status, a cloud print (GCP) version, and a license key. The printing device details displayed in printing device details area 404 may be stored in printing device status data 200. Note that MDT 110 is capable of displaying information for printing devices for which some of the steps described herein have been performed manually, and not using MDT 110. For example, MDT 110 is capable of discovering and acquiring information for a printing device that was manually registered with cloud print service 160. Thus, the approaches described herein for registering printing devices is compatible with existing manual methods.

A set of controls 406 allows a user to update the status of printing devices, add a printing device, delete printing devices, edit printing devices, import printing devices and export printing devices. According to one embodiment, MDT 110 includes functionality that allows a user to manually add information for a new printing device. This may be used to supplement the automatic discovery of printing devices by MDT 110.

Figure 4C:
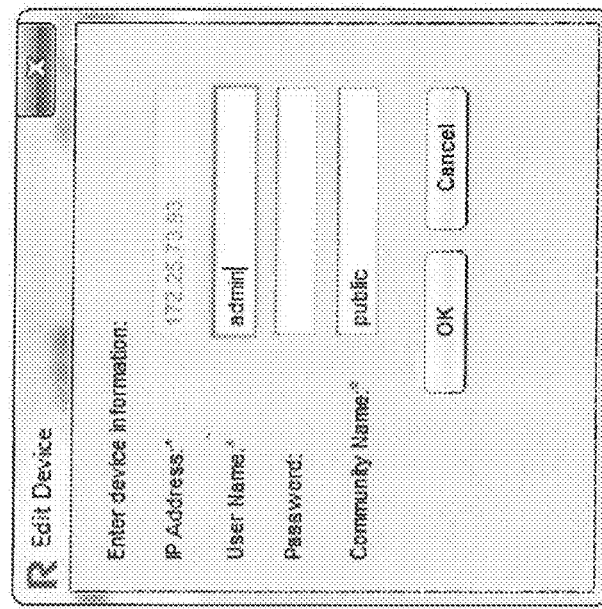
FIG. 4C depicts an example edit printing device screen generated by an MDT in response to a user selecting a printing device from the printing device details area on a printing device management screen, followed by an "Edit" control.
Figure 4B:
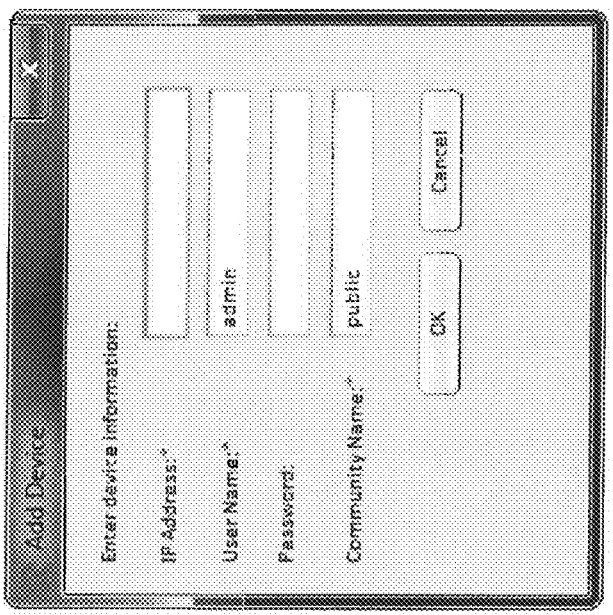
FIG. 4B depicts an example add printing device screen generated by an MDT in response to a user selecting an "Add" control to add a printing device.

FIG. 4B depicts an example add printing device screen 420 generated by MDT 110 in response to a user selecting the "Add" control from controls 406 to add a printing device. Add printing device screen 420 allows a user to specify information for a new printing device, including an IP address, a user name, a password, and a community name. The IP address is the IP address of the new printing device. The user name, password are administrative credentials that allow changes to be made to the printing device, and are used to install CPCA 122 on the new printing device. Credentials in the form of a user name and password are provided as one example of administrative credentials and embodiments are not limited to administrative credentials in the form of a user name and password, and other forms of administrative credentials may be used. The community name is a Simple Network Management Protocol (SNMP) community name used to authenticate SNMP traffic. The information for the new device specified via add printing device screen 420 may be stored in data 124, for example, as part of printing device identification data 240.

The "Delete" control from controls 406 allows a user to delete one or more selected printing devices. For example, a user may use a pointing device, such as a mouse, to select one or more printing devices from printing device details area 404. The user then selects the "Delete" control to cause the selected printing devices to be deleted from printing device details area 404. MDT 110 may include a confirmation mechanism that requests user confirmation of a request to delete a printing device before the request is processed. MDT 110 may also delete the selected printing devices from printing device status data 200.

MDT 110 includes functionality that allows a user to edit existing printing device information. FIG. 4C depicts an example edit printing device screen 430 generated by MDT 110 in response to a user selecting a printing device from the printing device details area 404 on printing device management screen 400, followed by the "Edit" control from controls 406. Edit printing device screen 430 allows a user to edit information for an existing printing device, including the user name, password, and SNMP community name that are maintained by MDT 110.

MDT 110 includes functionality that allows a user to import printing device information. This may be used to supplement the automatic discovery of printing devices by MDT 110. FIG. 4D depicts an example import printing device screen 440 generated by MDT 110 in response to a user selecting the "Import" control from controls 406 to import one or more new printing devices. Import printing device screen 430 allows a user to import information for one or more new printing devices. The information may be, for example, stored in a file in.CSV format and import printing device screen 440 allows a user to specify the file. FIG. 4E depicts example information included for each new printing device. Embodiments are not limited to imported data in.CSV format or the particular data depicted in FIG. 4E. Newly-imported printing devices may be viewed in printing device management screen 400 by selecting the "All" control from device list controls 402.

Similar to the "Import" control from controls 406, the "Export" control allows a user to export printing device information. The printing device information may be exported to a file in .CSV format, as previously described herein with respect to the "Import" function.

The "Update Status" control from controls 406 allows a user to update the status of all of the printing devices of which MDT 110 is aware. In response to a user selection of the "Update Status" control, MDT 110 queries each of the known printing devices to acquire current information for each printing device. This may also include MDT 110 performing full discovery to identify all available printing devices.

B. Registering Printing Devices

Figure 5A:
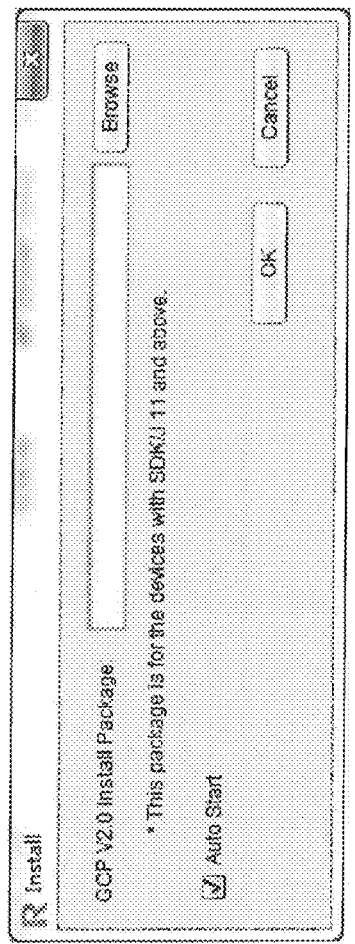
FIG. 5A depicts an example install CPCA screen generated by an MDT in response to a user selecting one or more printing devices from a printing device details area on a printing device management screen, followed by an "Install" control.

According to one embodiment, MDT 110 provides functionality that allows users to install and uninstall CPCA 122 to and from printing devices, register and unregister printing devices with cloud print service 106, and share printing devices with other users. As previously described herein, printing devices are registered for cloud printing with cloud print service 160 by CPCA 122 after being installed on the printing device. The first part of this process is installing CPCA 122 on printing devices 130, 140 as CPCA 132, 142, respectively. FIG. 5A depicts an example install CPCA screen 500 generated by MDT 110 in response to a user selecting one or more printing devices from the printing device details area 404 on printing device management screen 400, followed by the "Install" control from controls 408. Install CPCA screen 500 allows a user to specify a particular version of CPCA 122 to be installed on the selected printing devices. Install CPCA screen 500 also allows a user to specify, via a checkbox, that the installed CPCA 122 is to be automatically started after installation. According to one embodiment, MDT 110 determines one or more versions of CPCA 122 that may be installed on a selected printing device based upon the version of the Java virtual machine currently installed on the selected printing device. In the example depicted in FIG. 5A, the version of the installation package for CPCA 122 identified as "GCP V2.0" is for printing devices with "SDK/J 11" and above. According to one embodiment, a "best" version of the installation package for CPCA 122 is automatically selected by MDT 110 based upon the capabilities of the target printing devices.

The install CPCA screen 500 allows CPCA 122 to be installed on any number of selected printing devices. This allows a user, such as an administrator in a large business entity, to easily install CPCA 122 on a large number of printing devices. Once the install request is confirmed, via controls on install CPCA screen 500, MDT 110 causes the specified version of CPCA 122 to be transmitted to and installed on the selected printing devices. The installed versions of CPCA 122 are started if specified by the user via install CPCA screen 500. After successful installation, CPCAs 132, 134 may provide a conformation back to MDT 110 to enable MDT 110 to update the printing device status data 200 and printing device details area 404 on printing device management screen 400. As previously described herein, after installation, CPCAs 132, 134 may be automatically started and verify that they have an "Activated" license key before allowing printing devices 130, 140 to be registered with cloud print service 160. Also as previously described herein, CPCAs 132, 142 provide the unique identifications and OAuth tokens issued by cloud print service 160 for printing devices 130, 140 back to MDT 110 to allow MDT 110 to share registered print devices 130, 140 with other users as described in more detail hereinafter.

Figure 5B:
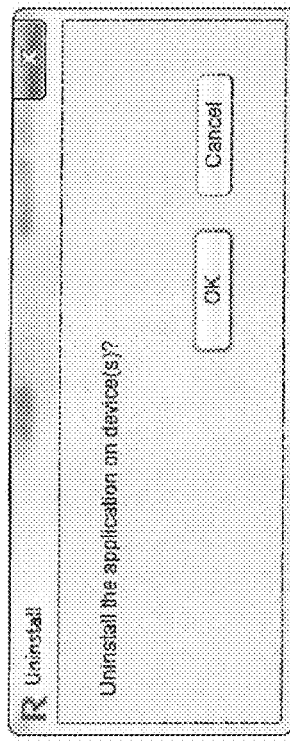
FIG. 5B depicts an example uninstall CPCA screen generated by an MDT in response to a user selecting one or more printing devices from a printing device details area on a printing device management screen, followed by an "Uninstall" control.

MDT 110 provides a convenient and easy way for users to uninstall CPCA 122 from any number of printing devices. FIG. 5B depicts an example uninstall CPCA screen 510 generated by MDT 110 in response to a user selecting one or more printing devices from the printing device details area 404 on printing device management screen 400, followed by the "Uninstall" control from controls 408. The uninstall CPCA screen 510 allows CPCA 122 to be uninstalled on any number of selected printing devices, after the user selects the "OK" control to confirm the uninstallation.

After CPCA 122 has been installed on printing devices 130, 140 as CPCA 132, 142, respectively, printing devices 130, 140 may be registered for cloud printing with cloud print service 160. MDT 110 provides a convenient and easy way for users to register large number of printing devices with cloud print service 160. FIG. 5C depicts an example register printing device screen 520 generated by MDT 110 in response to a user selecting one or more printing devices from the printing device details area 404 on printing device management screen 400, followed by the "Register" control from controls 408. Register printing device screen 520 allows a user to automatically register a large number of printing devices for cloud printing with cloud print service 160.

As depicted in FIG. 5C, register printing device screen 520 includes registration settings that are used to register the selected printing devices with cloud print service 160. The registration settings included in register printing device screen 520 are obtained from registration settings data 220 and the registration settings in register printing device screen 520 may be changed by a user prior to being used to register printing devices. For example, a user may change whether printing devices should operate using a "push" model or a "pull" model. The use of registration settings in this manner provides significant benefits to users. For example, a network administrator in a business organization may use a first set of registration settings to register a first set of printing devices, and then use a second (different) set of registration settings to register a second set of printing devices. In addition, as described in more detail hereinafter, MDT 110 provides a graphical user interface for specifying and editing the registration settings specified by registration settings data 220. Once the user confirms the registration settings by selecting the "OK" control, then the registration settings are transmitted to the CPCAs on the printing devices that were selected by the user. The CPCAs then use the registration settings to register the printing devices with cloud print service 160. According to one embodiment, printing devices are registered using general settings specified by general settings data 210. As described in more detail hereinafter, the general settings include a username, password, and SNMP community name. Printing devices are registered using a common set of credentials, for example the credentials of an administrator, but registered printing devices may be shared with other users, as described in more detail hereinafter.

C. Sharing Registered Printing Devices

According to one embodiment, MDT 110 provides the capability for users to share registered printing devices. This generally involves MDT 110 invoking sharing functionality provided by cloud print service 160. One of the benefits of this approach is that it allows a user to share a large number of printing devices with a large number of users quickly and easily as a batch, instead of having to manually and separately share each individual registered printing device.

Figure 5D:
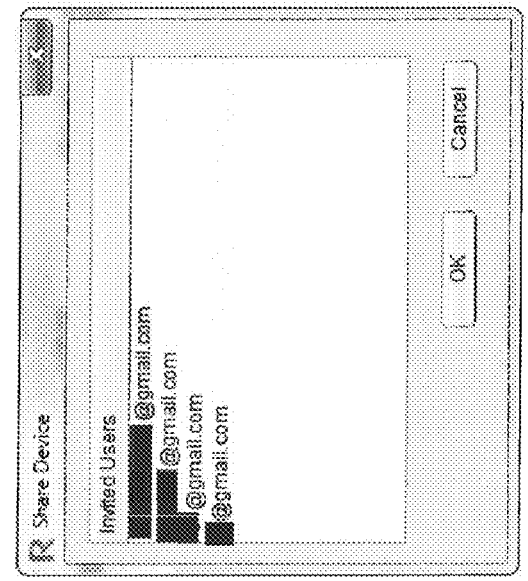
FIG. 5D depicts an example share printing device screen generated by an MDT in response to a user selecting one or more printing devices from a printing device details area on a printing device management screen, followed by a "Share" control.
Figure 5C:
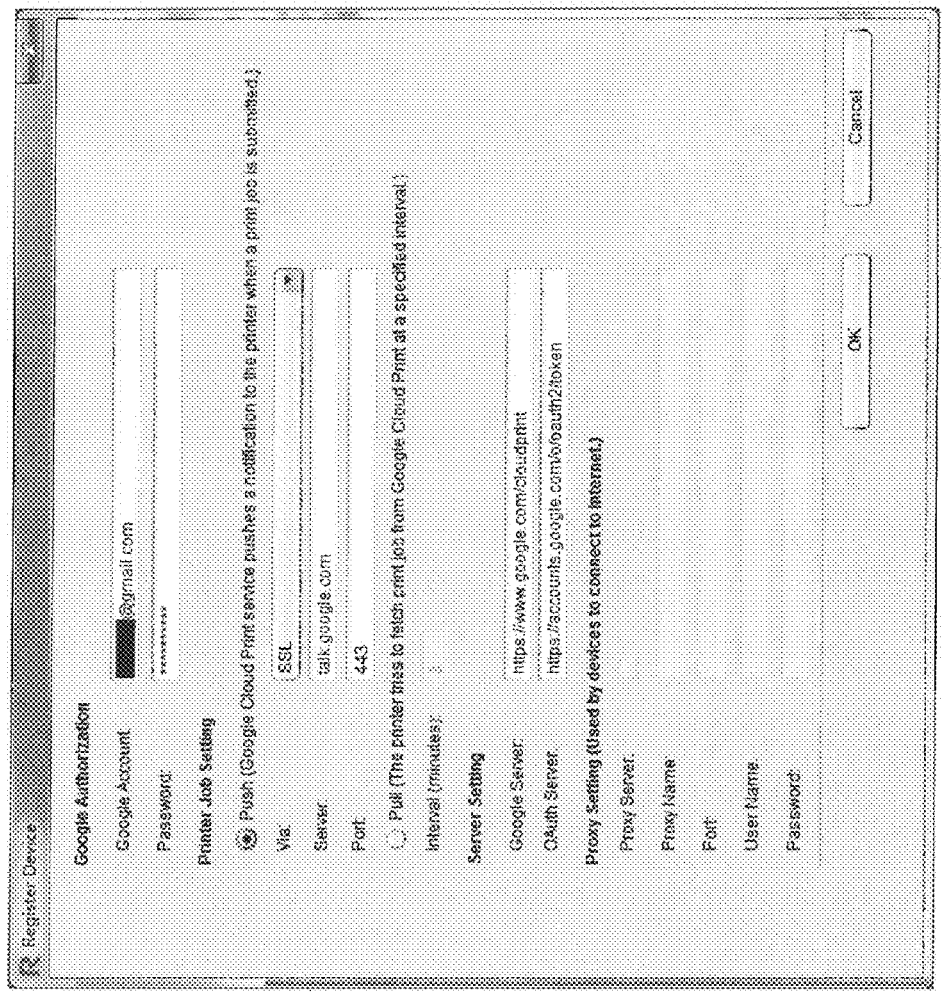
FIG. 5C depicts an example register printing device screen generated by an MDT in response to a user selecting one or more printing devices from a printing device details area on a printing device management screen, followed by a "Register" control.

FIG. 5D depicts an example share printing device screen 530 generated by MDT 110 in response to a user selecting one or more printing devices from the printing device details area 404 on printing device management screen 400, followed by the "Share" control from controls 408. Share printing device screen 530 allows a user to select, by email address, one or more invited users. After the selection of invited users is confirmed via selection of the "OK" control, MDT 110 transmits a share request to cloud print service 160 using the API provided by cloud print service 160 for each of the invited users. The share request includes the unique ID and OAuth token for the registered printing device issued by cloud print service during registration, the email address of the invited user, as well as any user credentials required by cloud print service 160. For example, cloud print service 160 may require that for a registered printing device to be shared, the unique ID for the printing device, the OAuth token, as well as a user ID/account, and password of the registered user be supplied to cloud print service 160. In response to each share request, cloud print service 160 sends a share invitation request to the email address specified in the share request. Once the invited user accepts the request, cloud print service 160 adds the recipient as an authorized user of the registered printing device. Registered printing devices may be shared with any number of users, depending upon any limits imposed by cloud print service 160. According to one embodiment, if a user has been sent an invitation and not yet accepted the invitation, when a user attempt to print from an application, the user will be prompted to accept the invitation to share the registered printer. This presumes that the application is configured to interact with cloud print service 160 to be aware of users to whom invitations have been sent, but not yet accepted.

D. Updating and Unregistering Registered Printing Devices

Figure 5E:
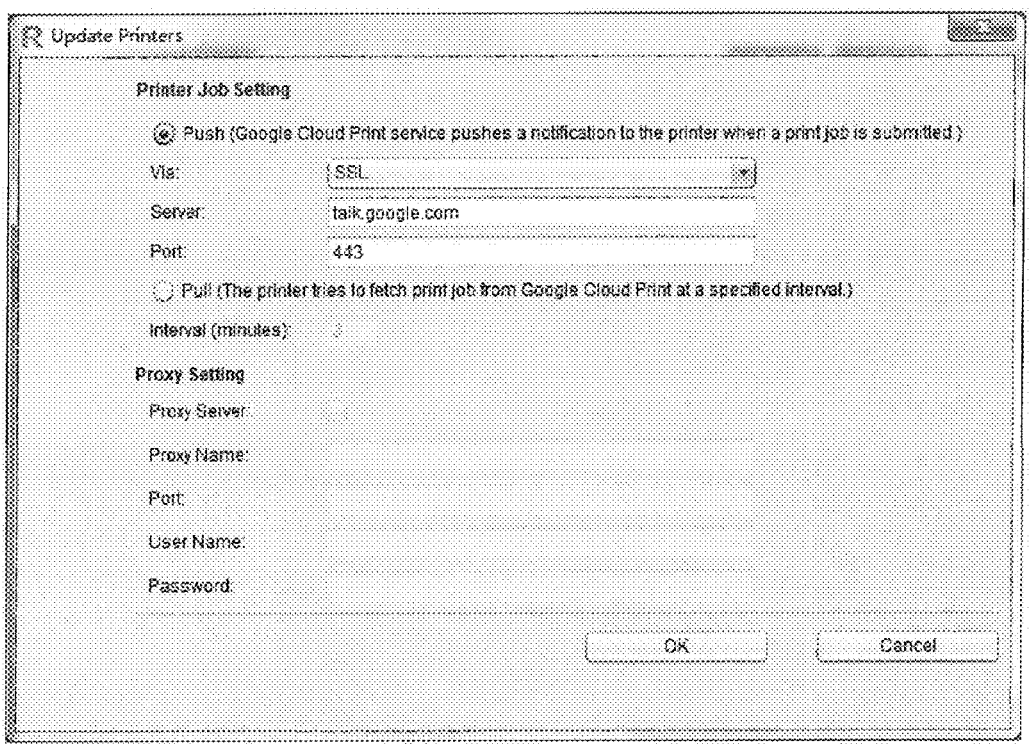
FIG. 5E depicts an update registration screen generated by an MDT in response to a user selecting one or more printing devices from a printing device details area on a printing device management screen, followed by an "Update" control.

According to one embodiment, MDT 110 provides the capability for users to update and unregister registered printing devices. FIG. 5E depicts an update registration screen 540 generated by MDT 110 in response to a user selecting one or more printing devices from the printing device details area 404 on printing device management screen 400, followed by the "Update" control from controls 408. Update registration screen 540 allows a user to update the registration settings for registered printing devices including, for example, whether a "pull" mode or "push" mode is used, proxy settings, etc. Upon selection of the "OK" control, the updated registration settings are transmitted to the CPCAs 122 for the specified printing devices, and the CPCAs 122 on the specified printing devices update the registration settings.

Figure 5F:
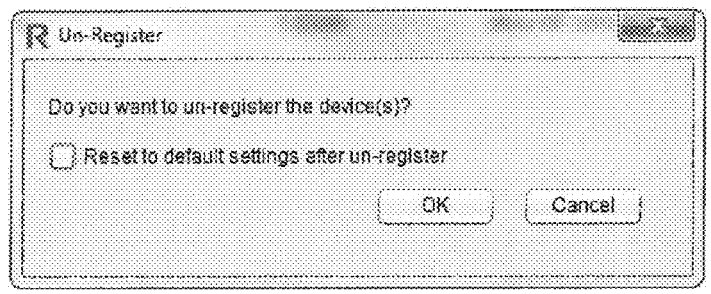
FIG. 5F depicts an unregister screen generated by an MDT in response to a user selecting one or more printing devices from a printing device details area on a printing device management screen, followed by an "Un-Register" control.

FIG. 5F depicts an unregister screen 550 generated by MDT 110 in response to a user selecting one or more printing devices from the printing device details area 404 on printing device management screen 400, followed by the "Un-Register" control from controls 408. Unregister screen 560 allows a user to quickly and easily unregister any number of registered printing devices. Upon selection of the "OK" control, MDT 110 notifies the CPCAs on the specified printing devices to unregister the printing devices with cloud print service 160. Upon a successful unregistering of the printing devices, the CPCAs may send a notification to MDT 110. According to one embodiment, unregistering a registered printing device does not also uninstall the CPCA installed on the printing device. Instead, the uninstallation of a CPCA is performed using the "Uninstall" control from controls 408, as previously described herein. Alternatively, unregistering of a registered printing device may also uninstall the CPCA from that printing device. Unregistered printing devices are available to be registered by other users.

V. Settings Management

Figure 6A:
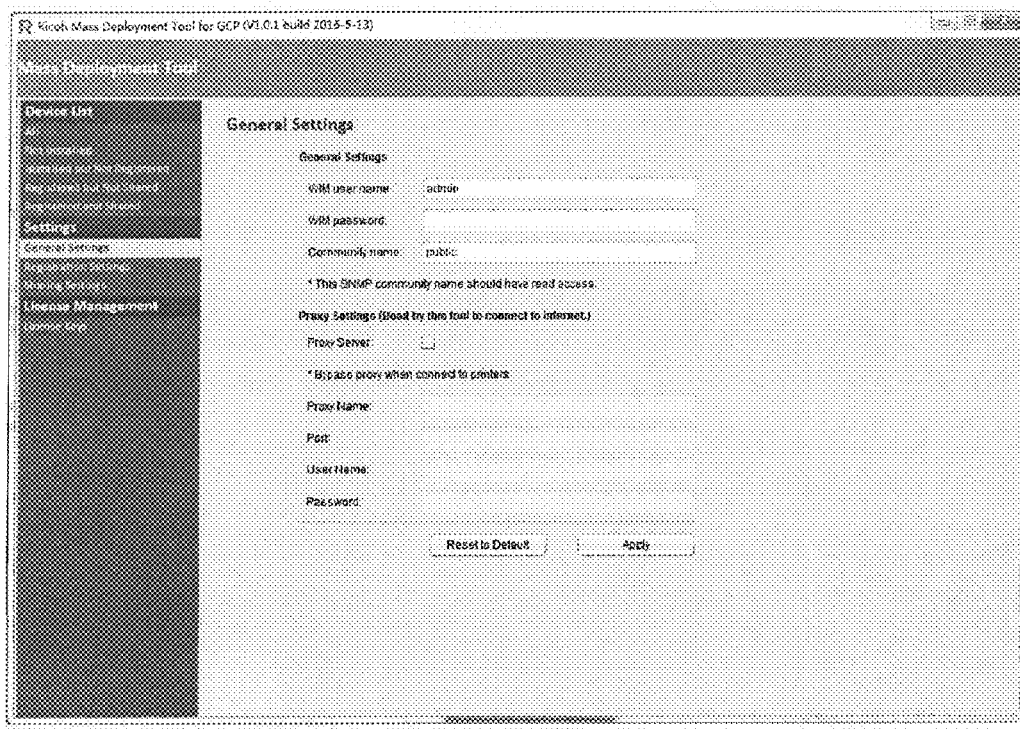
FIG. 6A depicts a general settings screen generated by an MDT in response to a user selecting a "General Settings" control.

According to one embodiment, MDT 110 provides the capability for users to manage various settings used by MDT and CPCA 122. These include general settings, registration settings and sharing settings. FIG. 6A depicts a general settings screen 600 generated by MDT 110 in response to a user selecting the "General Settings" control from controls 410. General settings screen 600 allows a user to specify general settings used for accessing printing devices to install CPCA 122 and to obtain contact information for users to be used to share registered printing devices. The general settings include printing device administration authentication, in the form of a Web Image (WI) user name, a WI password, and an SNMP community name, which are used to install CPCA on a printing device. The proxy settings are used for sharing users and for accessing user information from a directory, such as a Google directory. A proxy server is not needed to connect to printing devices.

Figure 6B:
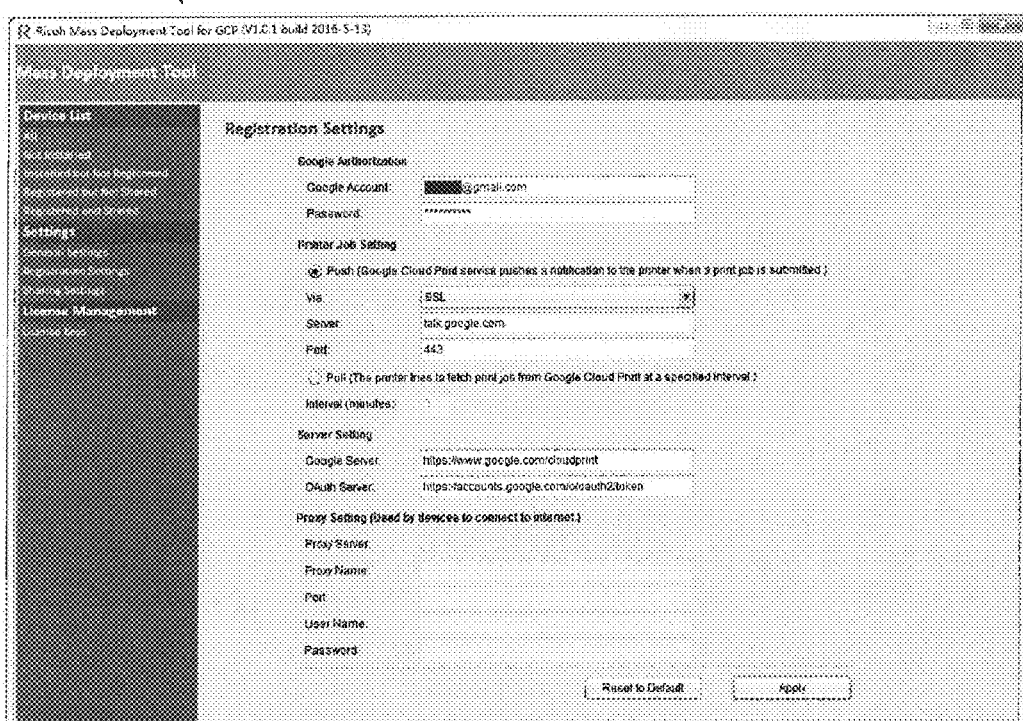
FIG. 6B depicts a registration settings screen generated by an MDT in response to a user selecting a "Registration Settings" control.

FIG. 6B depicts a registration settings screen 610 generated by MDT 110 in response to a user selecting the "Registration Settings" control from controls 410. Registration settings screen 610 allows a user to specify registration settings used for registering printing devices as described herein. The registration settings include user credentials for accessing cloud print service 160, which are depicted in FIG. 6B in the form of a Google authorization information. As described herein, the account associated with the user credentials will be the owner of a registered printing device. The account may be the account of an administrator within a business organization. The registration settings also include printer job settings, server settings and proxy settings. The printer job settings specify how registered printing devices obtain print data, for example using a "push" mode or a "pull" mode. The server settings specify a server for cloud print service 160 and an OAuth server. The proxy settings specify proxy server settings for printing devices.

Figure 6C:
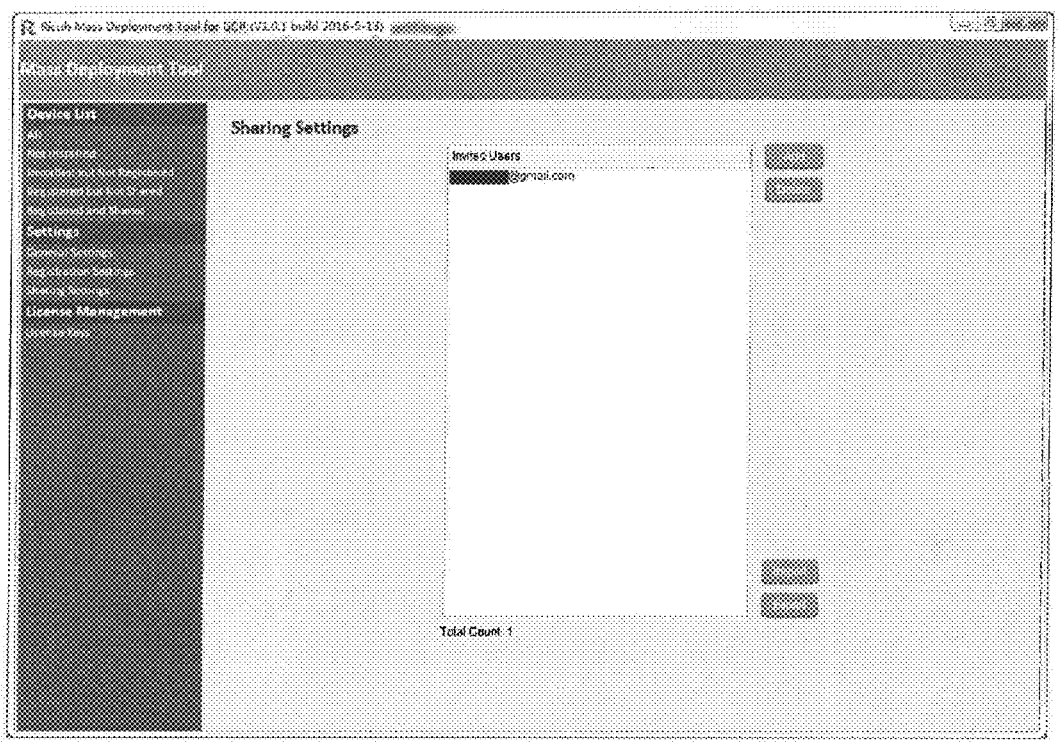
FIG. 6C depicts a sharing settings screen generated by an MDT in response to a user selecting a "Sharing Settings" control.
Figure 6D:
FIG. 6D is an add user screen generated by an MDT in response to a user selecting an "Add" control from a sharing settings screen.

FIG. 6C depicts a sharing settings screen 620 generated by MDT 110 in response to a user selecting the "Sharing Settings" control from controls 410. Sharing settings screen 620 allows a user to specify sharing settings used for sharing registered printing devices with other users and more specifically, to manage a list of email addresses for users that may be invited to share registered printing devices. Controls are provided to add, delete, import and export the email addresses for users that may be an account name, an account email, or a group. FIG. 6D is an add user screen 630 generated by MDT 110 in response to a user selecting the "Add" control from sharing settings screen 620. Add user screen 630 allows a user to specify a user name, email address or group name to be added to the list of available users in sharing settings screen 620. FIG. 6E is an import users screen 640 generated by MDT 110 in response to a user selecting the "Import" control from sharing settings screen 620. Import users screen 640 allows a user to select a .CSV file containing user names, email addresses and/or group names to be added to the list of available users in sharing settings screen 620. FIG. 6F depicts an example format of a .CSV file that contains user names, email addresses and/or group names, where the first line of the file includes a title "Invited Users."

Figure 6G:
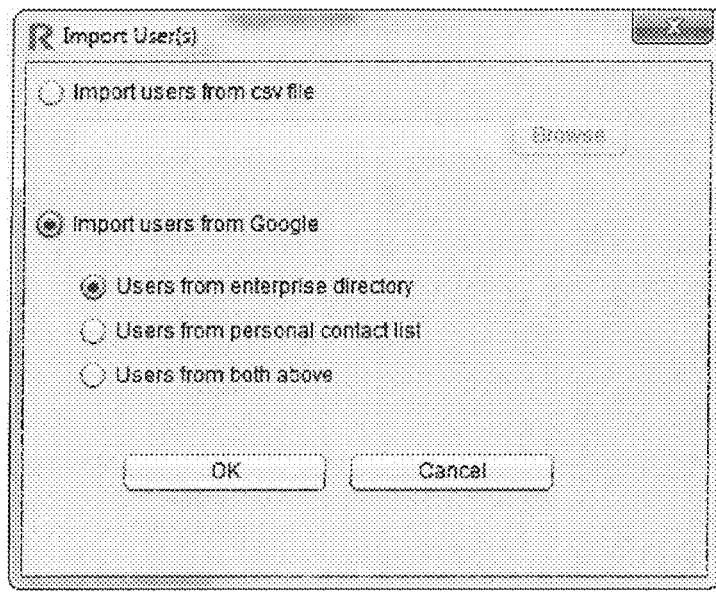
FIG. 6G is an import users screen generated by an MDT in response to a user selecting an "Import users from Google" control.
Figure 6H:
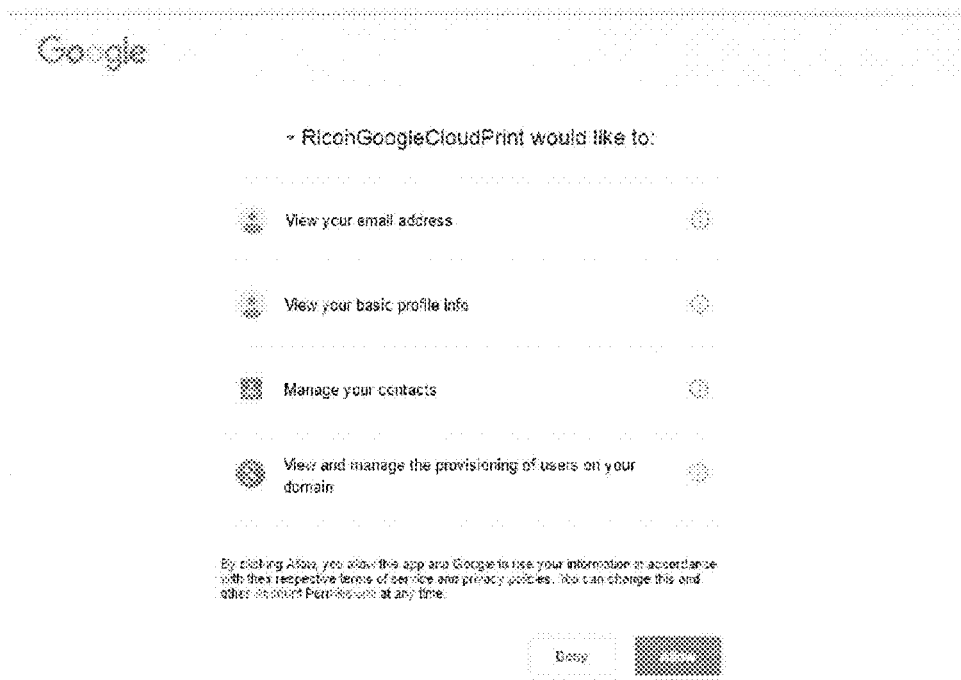
FIG. 6H depicts an authorization screen that obtains authorization for an MDT to access directory information.

As depicted in the import users screen 640 of FIG. 6E, users may also be imported from third party services, such as Google. FIG. 6G is an import users screen 660 generated by MDT 110 in response to a user selecting the "Import users from Google" control from import users screen 640 of FIG. 6E. In this example, users are imported from an enterprise directory and FIG. 6H depicts an authorization screen 670 that obtains authorization for MDT 110 to access the directory information and more specifically, the API of the Google directory service.

VI. License Management

Figure 7:
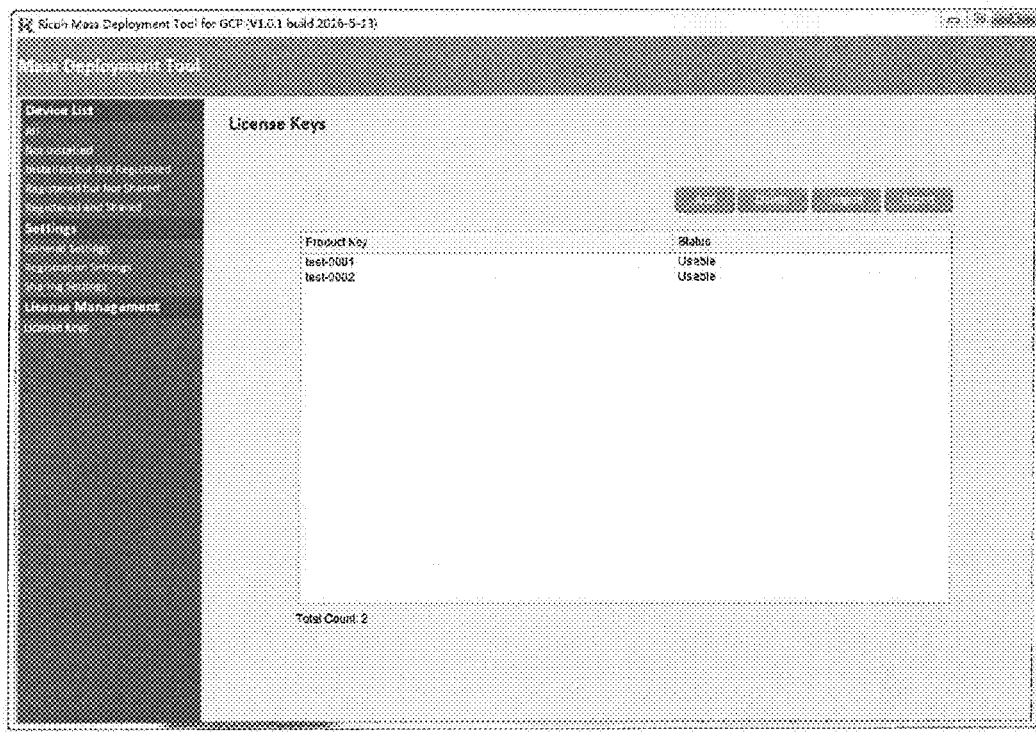
FIG. 7 depicts a license keys screen generated by an MDT in response to a user selecting a "License Keys" control.

According to one embodiment, MDT 110 provides the capability for users to manage licenses that are used to manage and track access to and usage of registered printing devices. FIG. 7 depicts a license keys screen 700 generated by MDT 110 in response to a user selecting the "License Keys" control from controls 410. License keys screen 700 allows a user to add, delete, import and export license keys that a user may select. Thus, a user may manually specify individual license keys, or import any number of license keys from external sources. A license key is selected by a user for a particular printing device, and transferred to the particular printing device to activate the CPCA on the particular printing device. According to one embodiment, license keys have a status of usable, not issued, activated and invalid, and can only be used once. In addition, MDT 110 may be configured to only accept license keys that are usable to activate a CPCA on a printing device. According to one embodiment, license key information, including license key status information, is maintained by license service 170. License key information may be maintained by MDT 110 in license key data 250.

VII. Implementation Mechanisms

Although the flow diagrams of the present application depict a particular set of steps in a particular order, other implementations may use fewer or more steps, in the same or different order, than those depicted in the figures.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
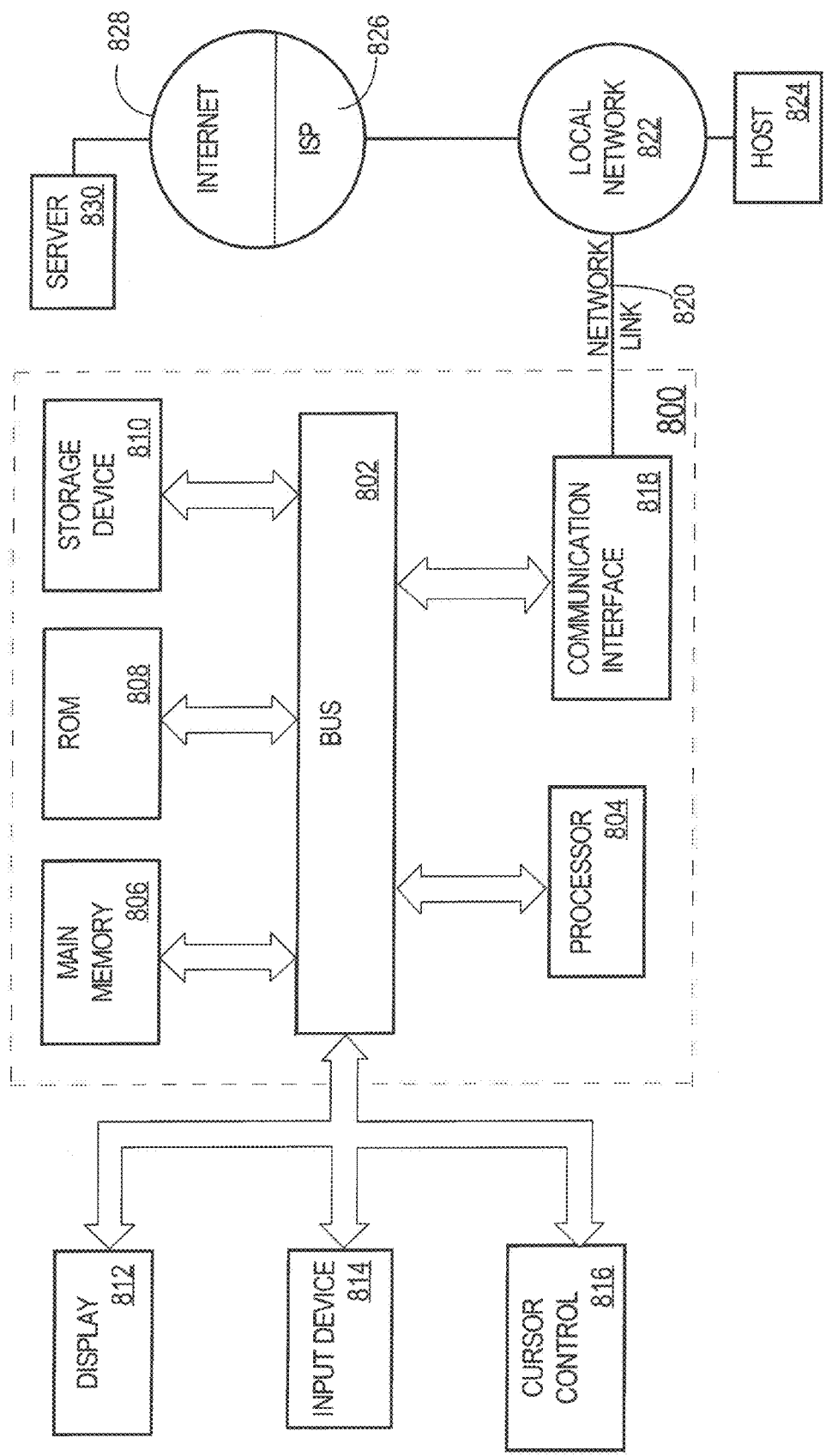
FIG. 8 is a block diagram of a computer system on which embodiments of the invention may be implemented.

FIG. 8 is a block diagram that depicts an example computer system 800 upon which embodiments may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. Although bus 802 is illustrated as a single bus, bus 802 may comprise one or more buses. For example, bus 802 may include without limitation a control bus by which processor 804 controls other devices within computer system 800, an address bus by which processor 804 specifies memory locations of instructions for execution, or any other type of bus for transferring data or signals between components of computer system 800.

An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic or computer software which, in combination with the computer system, causes or programs computer system 800 to be a special-purpose machine. According to one embodiment, those techniques are performed by computer system 800 in response to processor 804 processing instructions stored in main memory 806. Such instructions may be read into main memory 806 from another non-transitory computer-readable medium, such as storage device 810. Processing of the instructions contained in main memory 806 by processor 804 causes performance of the functionality described herein. In alternative embodiments, hard-wired circuitry may be used in place of or in combination with software instructions to implement the embodiments. Thus, embodiments are not limited to any specific combination of hardware circuitry and software.

The term "non-transitory computer-readable medium" as used herein refers to any non-transitory medium that participates in providing data that causes a computer to operate in a specific manner. In an embodiment implemented using computer system 800, various computer-readable media are involved, for example, in providing instructions to processor 804 for execution. Such media may take many forms, including but not limited to, non-volatile and volatile non-transitory media. Non-volatile non-transitory media includes, for example, optical or magnetic disks, such as storage device 810. Volatile non-transitory media includes dynamic memory, such as main memory 806. Common forms of non-transitory computer-readable media include, without limitation, a floppy disk, a flexible disk, hard disk, magnetic tape, or any other magnetic medium, a CD-ROM, any other optical medium, a RAM, a PROM, and EPROM, a FLASH-EPROM, any other memory chip, memory cartridge or memory stick, or any other medium from which a computer can read.

Various forms of non-transitory computer-readable media may be involved in storing instructions for processing by processor 804. For example, the instructions may initially be stored on a storage medium of a remote computer and transmitted to computer system 800 via one or more communications links. Bus 802 carries the data to main memory 806, from which processor 804 retrieves and processes the instructions. The instructions received by main memory 806 may optionally be stored on storage device 810 either before or after processing by processor 804.

Computer system 800 also includes a communication interface 818 coupled to bus 802. Communication interface 818 provides a communications coupling to a network link 820 that is connected to a local network 822. For example, communication interface 818 may be a modem to provide a data communication connection to a telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. The received code may be processed by processor 804 as it is received, and/or stored in storage device 810, or other non-volatile storage for later execution.

In the foregoing specification, embodiments have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An apparatus comprising:
   one or more processors, and
   one or more memories storing instructions which, when processed by the one or more processors, cause:
   a cloud print configuration application to be transmitted to and installed on a plurality of printing devices via one or more networks, wherein the plurality of printing devices are external to the apparatus,
   registration settings data to be transmitted to the plurality of printing devices via the one or more networks, wherein the registration settings data specifies one or more registration settings,
   the cloud print configuration application transmitted to and installed on the plurality of printing devices to register the plurality of printing devices with a cloud print service using the registration settings specified by the registration settings data, wherein the cloud print service is external to both the apparatus and the plurality of printing devices,
   receive, from the cloud print configuration application transmitted to and installed on the plurality of printing devices, identification data that specifies a unique identification issued by the cloud print service for each printing device, and
   store the identification data received from the cloud print configuration application installed on the plurality of printing devices.

2. The apparatus as recited in claim 1, wherein the one or more memories store additional instructions which, when processed by the one or more processors, cause user identification data, which identifies a plurality of users, to be transmitted to the cloud print service to allow the cloud print service to invite the plurality of users to use the plurality of printing devices.

3. The apparatus as recited in claim 2, wherein the one or more memories store additional instructions which, when processed by the one or more processors, cause a graphical user interface to be displayed that allows a user to specify the user identification data that identifies the plurality of users.

4. The apparatus as recited in claim 1, wherein the one or more memories store additional instructions which, when processed by the one or more processors, cause a unique license key to be transmitted to the cloud print configuration application installed on each printing device, from the plurality of printing devices, to allow the cloud print configuration applications to be activated.

5. The apparatus as recited in claim 1, wherein the one or more memories store additional instructions which, when processed by the one or more processors, cause a graphical user interface to be displayed that allows a user to specify, edit, and save the registration settings specified by the registration settings data.

6. The apparatus as recited in claim 1, wherein:
   access credentials are required to install the cloud print configuration application on the plurality of printing devices,
   the one or more memories store additional instructions which, when processed by the one or more processors, cause:
   general settings data to be transmitted to the plurality of printing devices, wherein the general settings data specifies the access credentials required to install the cloud print configuration application on the plurality of printing devices,
   a graphical user interface to be displayed that allows a user to specify the access credential specified by the general settings data, and
   the installation of the cloud print configuration application on the plurality of printing devices is performed using the access credential specified by the general settings data.

7. The apparatus as recited in claim 1, wherein the one or more memories store additional instructions which, when processed by the one or more processors, cause discovering and obtaining current status of the plurality of printing devices.

8. The apparatus as recited in claim 1, wherein the cloud print configuration application transmitted to and installed on the plurality of printing devices implements at least a portion of an application program interface of the cloud print service.

9. One or more non-transitory computer-readable media storing instructions which, when processed by one or more processors, cause:
   a cloud print configuration application to be transmitted to and installed on a plurality of printing devices via one or more networks, wherein the plurality of printing devices are external to an apparatus,
   registration settings data to be transmitted to the plurality of printing devices via the one or more networks, wherein the registration settings data specifies one or more registration settings,
   the cloud print configuration application transmitted to and installed on the plurality of printing devices to register the plurality of printing devices with a cloud print service using the registration settings specified by the registration settings data, wherein the cloud print service is external to both the apparatus and the plurality of printing devices,
   the apparatus to receive, from the cloud print configuration application transmitted to and installed on the plurality of printing devices, identification data that specifies a unique identification issued by the cloud print service for each printing device, and
   store the identification data received from the cloud print configuration application installed on the plurality of printing devices.

10. The one or more non-transitory computer-readable media as recited in claim 9, further storing additional instructions which, when processed by the one or more processors, cause user identification data, which identifies a plurality of users, to be transmitted to the cloud print service to allow the cloud print service to invite the plurality of users to use the plurality of printing devices.

11. The one or more non-transitory computer-readable media as recited in claim 10, further storing additional instructions which, when processed by the one or more processors, cause a graphical user interface to be displayed that allows a user to specify the user identification data that identifies the plurality of users.

12. The one or more non-transitory computer-readable media as recited in claim 9, further storing additional instructions which, when processed by the one or more processors, cause a unique license key to be transmitted to the cloud print configuration application installed on each printing device, from the plurality of printing devices, to allow the cloud print configuration applications to be activated.

13. The one or more non-transitory computer-readable media as recited in claim 9, further storing additional instructions which, when processed by the one or more processors, cause a graphical user interface to be displayed that allows a user to specify, edit, and save the registration settings specified by the registration settings data.

14. The one or more non-transitory computer-readable media as recited in claim 9, wherein:
   access credentials are required to install the cloud print configuration application on the plurality of printing devices,
   the one or more non-transitory computer-readable media store additional instructions which, when processed by the one or more processors, cause:
      general settings data to be transmitted to the plurality of printing devices, wherein the general settings data specifies the access credentials required to install the cloud print configuration application on the plurality of printing devices,
      a graphical user interface to be displayed that allows a user to specify the access credential specified by the general settings data, and
   the installation of the cloud print configuration application on the plurality of printing devices is performed using the access credential specified by the general settings data.

15. The one or more non-transitory computer-readable media as recited in claim 9, further storing additional instructions which, when processed by the one or more processors, cause discovering and obtaining current status of the plurality of printing devices.

16. The one or more non-transitory computer-readable media as recited in claim 9, wherein the cloud print configuration application transmitted to and installed on the plurality of printing devices implements at least a portion of an application program interface of the cloud print service.

17. A computer-implemented method comprising:
   causing a cloud print configuration application to be transmitted to and installed on a plurality of printing devices via one or more networks, wherein the plurality of printing devices are external to an apparatus,
   causing registration settings data to be transmitted to the plurality of printing devices via the one or more networks, wherein the registration settings data specifies one or more registration settings,
   causing the cloud print configuration application transmitted to and installed on the plurality of printing devices to register the plurality of printing devices with a cloud print service using the registration settings specified by the registration settings data, wherein the cloud print service is external to both the apparatus and the plurality of printing devices,
   receiving, from the cloud print configuration application transmitted to and installed on the plurality of printing devices, identification data that specifies a unique identification issued by the cloud print service for each printing device, and
   storing the identification data received from the cloud print configuration application installed on the plurality of printing devices.

18. The computer-implemented method as recited in claim 17, further comprising causing user identification data, which identifies a plurality of users, to be transmitted to the cloud print service to allow the cloud print service to invite the plurality of users to use the plurality of printing devices.

19. The computer-implemented method as recited in claim 17, further comprising causing a unique license key to be transmitted to the cloud print configuration application installed on each printing device, from the plurality of printing devices, to allow the cloud print configuration applications to be activated.

20. The computer-implemented method as recited in claim 17, wherein:
   access credentials are required to install the cloud print configuration application on the plurality of printing devices,
   the computer-implemented method further comprises:
      causing general settings data to be transmitted to the plurality of printing devices, wherein the general settings data specifies the access credentials required to install the cloud print configuration application on the plurality of printing devices, and
      causing a graphical user interface to be displayed that allows a user to specify the access credential specified by the general settings data, and
   the installation of the cloud print configuration application on the plurality of printing devices is performed using the access credential specified by the general settings data.

* * * * *